Patented Oct. 13, 1953

2,655,533

UNITED STATES PATENT OFFICE 2,655,533

DIGUANIDINE AMIDES OF ALKANE PHOSPHONIC ACIDS

Allen H. Lewis and Richard D. Stayner, Berkeley, Calif., assignors to California Research Corporation, San Francisco, Calif., a corporation of Delaware No Drawing. Original application September 29, 1950, Serial No. 187,679. Divided and this application November 10, 1951, Serial No. 255,871

2 Claims. (Cl. 260—551)

This invention is concerned with amides and, more particularly, with diamides of alkane phosphonic acids.

The present application is a division of application Serial No. 187,679 filed in the U. S. Patent Office on September 29, 1950 under the title "Amides of Alkane Phosphonic Acids."

The term "alkane phosphonic acid" as employed hereinafter in this specification shall mean an organo-substituted acid of phosphorus having the general formula

wherein R is a hydrocarbon substituent from the group consisting of alkyl radicals, cycloalkyl radicals and aralkyl radicals attached to the phosphorus atom by an aliphatic linkage. Correspondingly, the term "alkane phosphonyl dichloride" refers to an alkane phosphonic acid wherein both hydroxyl groups have been replaced by chlorine atoms.

A primary object of this invention is to provide a method for the preparation of new organic compounds containing amido-groups linked to phosphorus atoms and, in particular, the diamides of alkane phosphonic acids.

Another object of the invention is the preparation of diamides possessing surface activity which are particularly suitable for use as wetting agents in the treatment of textiles, in agricultural sprays, in biologically-active compositions, and in many other industrial applications. Other objects will appear from the description which follows.

Amides of alkane phosphonic acids have been prepared in the past by first reacting an aliphatic alpha-beta unsaturated ketone, or an aldehyde, with PCl₃, or PBr₃, to form an intermediate cyclic phosphonyl monohalide which was then reacted with an amine. The resulting amides were invariably characterized by the presence of pentavalent phosphorus directly attached to a carbon atom of an aliphatic chain in the position beta to an oxo-substituted carbon atom and, furthermore, directly attached by at least one other valence bond to an amino-nitrogen atom.

We have found that by reacting various hydroxy amines and, in particular, primary and secondary alkylol amines, with alkane phosphonyl dichlorides, new and valuable amido-compounds can be obtained. When the molar ratio of alkylol amines to alkane phosphonyl dichlorides in the reaction mixture is equal to or greater than 4, compounds are produced which are essentially diamides of alkane phosphonic acids corresponding to the alkane phosphonyl dichlorides employed for the reaction, and which have the general formula

wherein X is an alkylol group and R may be a cycloalkyl group, and aralkyl group or an alkyl group.

Among the alkane phosphonyl dichlorides, those in which the hydrocarbon substituent attached to the phosphorus is an alkyl radical containing at least 6 carbon atoms, and preferably from 10 to 20 carbon atoms, represent particularly suitable materials for the formation of amido-compounds of our invention.

The various hydroxy amines suitable for the formation of amido-compounds of our invention comprise primary and secondary alkylol amines containing the group

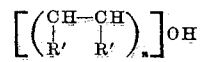

wherein R' is a hydrogen or an alkyl radical and n is an integer equal to from 1 to 6, and preferably from 1 to 2, as well as polyalkylene glycol amines containing the group

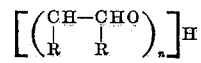

wherein R is a hydrogen or an alkyl radical and n is an integer equal to from 1 to 6.

Although alkylol amines, such as diethanolamine, have been mentioned in the prior art in connection with the preparation of phosphonamides by the afore-indicated reaction of alpha-beta unsaturated aliphatic ketones or aldehydes, with PCl₃, followed by the addition of an amine to the reaction product, the final products obtained by this procedure are amides containing a carbonyl group in the aliphatic chain attached to the phosphorus atom.

In the present invention, however, by employing an excess of a primary or secondary alkylol amine, namely, at least 4 mols of alkylol amine to one mol of alkane phosphonyl dichloride, we obtain a reaction product which is substantially a diamide having the formula

shown hereinbefore, where X is an alkylol group and containing no carbonyl groups.

The products of reaction with alkylol amines ordinarily have the physical appearance of colorless to light amber-colored viscous liquids and waxy solids. However, some of the products of my invention, e. g., the reaciton products of hydroxycyclohexane phosphonyl dichloride with alkylol amines, are recoverable from the reaction mixture in the form of crystalline solids.

Diamides of alkane phosphonic acids may be also prepared in accordance with our invention by employing primary and secondary amines, such as diethylene triamine and triethylene tetramine, for the reaction with alkane phosphonyl dichloride, the mol ratios of the amine to the alkane phosphonyl dichloride being similar to those set forth in the description of the general procedure for the reaction of alkylol amines.

Likewise, mixtures of primary and secondary alkylol amines with primary and secondary amines may be reacted with alkane phosphonyl dichlorides by following the process of this invention and yield mixed phosphonamides.

Cyclic organic compounds containing in the ring more than 4 but less than 7 carbon atoms and a secondary amine group as, for instance, piperidine and morpholine, as well as acyclic imido compounds containing at least one primary amino group, as exemplified by guanidine, may be reacted in a similar manner with alkane phosphonyl dichlorides to yield amido compounds of our invention provided that the molar ratios of the compound containing the amino group to the phosphonyl dichloride correspond to those ratios indicated hereinbefore for the production of diamides from alkylol amines and alkane phosphonyl dichlorides.

All of these diamides may be represented as containing the structural grouping

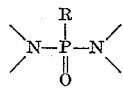

wherein R is an alkyl radical, a cycloalkyl radical, or an aralykyl radical aliphatically linked to the phosphorus atom, and wherein nitrogen may be linked to a hydrogen or an alkyl group, as in an amine, or to an alkylol group, as in an alkylol amine and a polyalkylene glycol amine, or to a hydrogen and a corbon atom as would be the case of guanidine, or yet wherein nitrogen may form a part of a heterocyclic organic compound such as morpholine, piperidine, and the like. Thus, the free valences of nitrogen atoms in the aforegiven structural grouping can be linked only to hydrogen and carbon atoms so as to form amido groups.

Specifically, those diamides derived from primary and secondary alkylol amines, or from primary and secondary amines, or from mixtures of such alkylol amines with primary and secondary amines, can be represented by the formula

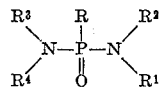

wherein R is an alkyl, a cycloalkyl, or an aralkyl radical and $R^1$, $R^2$, $R^3$ and $R^4$ are radicals selected from the group consisting of hydrogen, alkyl, alkylol and polyalkylene glycol radicals.

Those diamides, in which at least one of the radicals $R^1$, $R^2$, $R^3$ and $R^4$ in the above formula is an alkylol radical, form the particularly important group of amido compounds of our invention because of their surface-active properties.

Diamides of alkane phosphonic acids in which the $R^1$, $R^2$, $R^3$ and $R^4$ radicals in the above formula are all alkylol radicals, e. g., hydroxyethyl, hydroxypropyl, hydroxyethoxyethyl, hydroxypolyethoxyethyl, are particularly important since they have been found to possess good wetting properties which render these diamides attractive for the preparation of a large number of compositions for industrial and household uses, as will be seen from the test data incorporated hereinafter in Tables I and II.

The preparation of our diamides is quite simple. The reactants are brought together at about room temperature by introducing an alkane phosphonyl dichloride into an alkylol amine, an amine or their mixture. If desired, the alkylol amine may be first dissolved in a suitable inert solvent such as acetone to insure homogeneity. While adding the dichloride the contents of the reaction vessel are continuously shaken or stirred with simultaneous cooling, the reaction being exothermic. When the desired amount of dichloride has been added, the mixture is heated on a steam bath for a short period of time, from 5 to 10 minutes, or more if so required, to complete the reaction. The reaction mixture is diluted with water, acidified with hydrochloric acid to neutralize the excess amine and extracted into an ether-alcohol solution. The remaining product is washed with water, or preferably with a dilute aqueous solution of sodium sulfate to remove any remaining traces of amine hydrochloride, and is dried over anhydrous calcium sulfate (Drierite), or other suitable desiccant. Thereupon the solvents are evaporated and the final amide product is recovered and identified.

The general mode of operation of our invention is shown by the following examples of hydroxyethyl and hydroxypropyldiamides of longchain alkane phosphonic acids containing from 10 to 20 carbon atoms in the alkyl chain. These examples are merely illustrative, however, and do not limit the scope of the invention.

EXAMPLE 1

19 grams of octadecane phosphonyl dichloride is added gradually to 23 grams of diethanolamine dissolved in 25 ml. of acetone, while shaking and cooling the reaction mixture. After the completion of the addition, the reaction mixture is warmed on a steam bath for about 5 to 10 minutes, cooled to room temperature, diluted with 10 parts of water and acidified with hydrochloric acid. Thereupon the reaction mixture is extracted with 25 parts of ether, washed with 40 parts of water and dried with the aid of Drierite. On evaporating the solvent, a light amber-colored viscous liquid is obtained, which is shown by analysis to have the structural formula

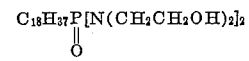

and is identified as N,N'-bis(di-2-hydroxyethyl)-octadecane phosphonamide. Its nitrogen analysis gives a value of 5.5% which is in agreement with the calculated value of 5.6%.

EXAMPLE 2

16.2 grams of tetradecane phosphonyl dichloride is added gradually to 16.5 grams of monoisopropanolamine, while shaking and cooling the reaction mixture as shown in Example 1. The final product is recovered in the same manner as described in Example 1, and a tan-colored viscous liquid is obtained, which upon analysis is assigned the structural formula

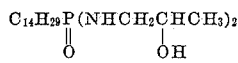

This formula corresponds to N,N'-bis(2-hydroxypropyl)-tetradecane phosphonamide. The nitrogen analysis value for this diamide is 7.05% which is in agreement with the calculated value of 7.15%.

A number of other alkylol amines, among them monoethanolamine and di-isopropanolamine, have been employed to prepare corresponding diamides and mixed diamides of long-chain alkane phosphonic acids having from 10 to 20 atoms in the alkyl chain. All of these diamides are characterized by a moderate to high degree of surface activity. In particular, the diamides of long-chain alkane phosphonic acids are found to be good wetting agents, the monoisopropanol diamide of dodecane phosphonic acid being especially effective and, in fact, more active than a number of known wetting agents when employed in dilute aqueous solutions.

Those diamides derived in accordance with our invention from polyalkylene glycol amines are found to possess good emulsifying characteristics.

A comparison of wetting characteristics of the diamides is presented in the following tables. Table I shows the wetting activity of aqueous solutions having a 0.5% concentration of new surface-active diamides of our invention produced by reacting long-chain phosphonyl dichlorides with primary and secondary amines and alkylol amines, compared with the wetting activity of a well-known commercial non-ionic wetting agent A, namely, tertiary octyl phenyl nonyl glycol ether, and another well-known anionic detergent B, namely, sodium polyproylene benzene sulfonate containing from $C_{12}$ to $C_{15}$ carbon atoms in the polypropylene chain. The wetting times given in seconds were determined by the canvas-square method. This method consists in determining the length of time required for a one-inch square of canvas placed on the surface of 2 ml. of solution in a 250 ml. beaker to become wet and to sink to the bottom of the beaker.

*Table I*

EVALUATION OF WETTING ACTIVITY OF DIAMIDES (IN AN AQUEOUS SOLUTION OF 0.5% CONCENTRATION)

| No. | Original amine | No. of C atoms in alkyl chain of alkane phosphonyl dichloride attached to P atom, wetting times in seconds | | | |
|---|---|---|---|---|---|
| | | $C_{12}$ | $C_{14}$ | $C_{16}$ | $C_{18}$ |
| 1 | Monoethanolamine | 9.8 | 20.9 | 46.9 | |
| 2 | Diethanolamine | 19.7 | 63.2 | 92.8 | 93.2 |
| 3 | Monoisopropanolamine | 8.5 | 23.6 | 24.8 | 34.4 |
| 4 | Di-isopropanolamine | 10.5 | 13.5 | 27.8 | 43.8 |
| 5 | Diethylene triamine | | 58.0 | | |
| 6 | Triethylene amine | | 82.0 | | |
| 7 | Non-ionic wetting agent A | | | | 7.1 |
| 8 | Anionic wetting agent B | | | | 6.1 |
| 9 | Water | | | | >300 |

The results in the above table show that the diamide prepared by reacting monoisopropanolamine and dodecane phosphonic acid is a particularly effective wetting agent. Table I further indicates that the optimum wetting activity is obtained with alkylol amine derivatives of $C_{12}$ to $C_{14}$ alkane phosphonic acid, the $C_{12}$ alkane phosphonic acid being preferred.

Table II illustrates the wetting activity of diamide compounds of our invention in aqueous solutions of different concentrations as compared with the wetting activties of the same wetting agents A and B shown in Table I. The excellent wetting characteristics of the diamide produced by reacting dodecane phosphonyl dichloride and monoisopropanol amine are further reaffirmed by the data in this table.

*Table II*

RESULTS OF THE EVALUATIONS OF THE WETTING ACTIVITIES OF DILUTE SOLUTIONS OF SOME N-ALKANEPHOSPHONAMIDES

| No. | Chain length of alkane residue | Alkanephosphonamide | Concentration (percent) | | |
|---|---|---|---|---|---|
| | | | 0.5 | 0.25 | 0.10 |
| 1 | $C_{12}H_{25}$ | Monoisopropanoldiamide | 8.5 | 13.4 | 19.2 |
| 2 | $C_{12}H_{25}$ | Monoethanoldiamide | 9.9 | 18.7 | 31.8 |
| 3 | $C_{12}H_{25}$ | Di-isopropanoldiamide | 10.5 | 25.0 | 54.0 |
| 4 | $C_{14}H_{29}$ | Monoethanoldiamide | 20.9 | 87.1 | 106.7 |
| 5 | $C_{14}H_{29}$ | Di-isopropanoldiamide | 13.5 | 42.8 | 116.7 |
| 6 | Non-ionic wetting agent A | | 7.1 | 19.6 | 32.4 |
| 7 | Anionic wetting agent B | | 6.1 | 12.7 | 28.3 |

As mentioned already, organic compounds such as morpholine, guanidine and piperidine, may be employed for the production of amido compounds in conformity with our invention and the resulting compounds possess varying degrees of surface activity. Thus, for instance, morpholine reacted with dodecane phosphonyl dichloride in a mol ratio of 4 mols of morpholine to 1 mol of dichloride forms a new diamide (dodecane phosphonyl dimropholide)

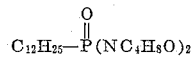

A 0.5% aqueous solution of this diamide has a wetting time of 26.0 seconds, determined by the canvas-square method. Morpholine also reacts with tetradecane phosphonyl dichloride under similar conditions to form a diamide (tetradecane phosphonyl dimorpholide)

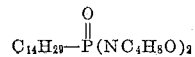

A 0.5% aqueous solution of this latter, tested by the canvas-square method, indicates a wetting time of 32.4 seconds.

Piperidine reacted with dodecane phosphonyl dichloride and tetradecane phosphonyl dichloride under the conditions set forth hereinbefore (mol ratio 4:1, etc.) yields corresponding surface-active dodecane and tetradecane phosphonyl dipiperidides.

Guanidine reacted with dodecane phosphonyl dichloride in a mol ratio of 4:1 as set forth in the preceding description yields diguanidine amide of dodecane phosphonic acid, a 0.5% aqueous solution whereof is found to have a wetting time of 89.0 seconds as determined by the canvas-square method. In addition to being suitable for use as wetting agents, diguanidine amides of our invention constitute effective anti-stripping agents for indoor and outdoor asphaltic surface-coatings.

Salts of diguanidine amides of alkane phosphonic acids with inorganic acids, e. g., the hydrochloride of the aforementioned diguanidine amide of dodecane phosphonic acid, are also good wetting and emulsifying agents.

While all of the diamides produced by following the method of our invention possess some degree of surface-activity, the diamides, and mixed amides derived from alkylol amines, are particularly remarkable in this respect. The diamides produced by the reaction of alkane phosphonyl dichlorides having from 12 to 18 carbon atoms in the alkyl chain with alkylol amines appear to be exceptionally important in view of their very attractive wetting characteristics, as illustrated by the data in Tables I and II.

It has been found that alkane phosphonyl dichlorides with less than 6 carbon atoms in the alkyl chain may also be employed to produce corresponding diamides and mixed amides. However, these compounds ordinarily will not be effective surface-active agents.

As a general rule, the water-solubility of diamides of our invention may be adjusted by an appropriate combination of alkylol amines and alkane phosphonyl dichlorides: the greater will be the number of glycol units in the alkylol portion of the resulting amide, the more water-soluble will it be and the more will it approach the consistency of a waxy solid upon recovery from the reaction mixture.

It is to be noted that the preferred amount of at least 4 mols of alkylol amine for the production of diamides may be reduced to 2 mols, provided at least 2 mols of pyridine or other suitable acceptor for HCl, e. g., NaHCO₃, Na₂CO₃, aqueous NaOH, are employed to remove the HCl from the reaction. This last procedure—application of NaOH—is extremely delicate and must be carried out very carefully, as otherwise NaOH would hydrolyze the phosphonyl dichloride and thus prevent the successful preparation of the diamide.

To produce a mixed diamide of an alkane phosphonic acid of the general structure

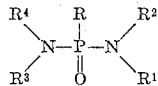

wherein R is an alkyl, an aralkyl or a cycloalkyl radical and R¹, R², R³ and R⁴ are either hydrogen, alkyl or alkylol radicals, by the reaction of an alkane phosphonyl dichloride with two different primary or secondary amines, or alkylolamines, or with an amine and an alkylolamine, the following procedure is employed: First, the alkane phosphonyl dichloride is reacted with one of the aforementioned nitrogen-bearing reactants in a mol ratio of 1:1 and in the presence of a sufficient quantity of an acceptor for the HCl formed in this reaction stage. An intermediate alkane chlorophosphonamide

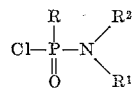

is formed and is reacted with another nitrogen-containing reactant in a mol ratio of 1:1, likewise in the presence of a sufficient amount of an acceptor for HCl formed in this second reaction stage. The acceptor for HCl, employed in the production of these mixed amides, may be aqueous NaOH, pyridine, or the very same amine or alkylol amine of each respective reaction stage (one mol of amine or alkylol amine).

In a modification of the above procedure, one may also react an alkane phosphonyl dichloride with an amino group-containing reactant in a mol ratio of 1:2, without introducing acceptors for the HCl formed in the first stage of the reaction. The intermediate is then reacted with a second amino group-containing reactant in a mol ratio of 1:2 again in the absence of a separate acceptor for HCl.

Another modification which may be employed in the preparation of mixed amides of our invention involves the following process steps: An alkane phosphonyl dichloride is first reacted with an amino group-bearing reactant in a mol ratio of 1:1 in the presence of a sufficient amount of an acceptor for HCl, whereupon the resulting intermediate alkane chlorophosphonamide is again reacted with a second amino group-bearing reactant in a ratio of 1:2 without introducing an acceptor for HCl.

Organic nitrogen-containing basic compounds, e. g., a tertiary amine such as pyridine, are preferred as acceptors for HCl to inorganic compounds such as aqueous sodium hydroxide, because they are less likely to cause the hydrolysis of phosphonyl dichloride.

Other amino compounds such as morpholine, guanidine or piperidine may be similarly employed for the reaction with alkane phosphonyl dichlorides to yield corresponding mixed diamides.

Since many widely different embodiments of this invention may be made without departing from the spirit and scope thereof, we do not limit ourselves to the specific embodiments recited hereinabove, except as defined in the appended claims.

We claim:
1. As new products, diguanidine amides of an alkane phosphonic acid having the structural formula

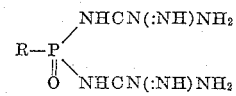

in which the alkane substituent attached to the phosphorus atom is an alkyl radical containing from 10 to 20 carbon atoms.

2. Dodecane phosphonyl diguanidide.

ALLEN H. LEWIS.
RICHARD D. STAYNER.

References Cited in the file of this patent
UNITED STATES PATENTS

| Number | Name | Date |
|---|---|---|
| 2,365,466 | Hamilton | Dec. 19, 1944 |
| 2,382,309 | Hamilton | Aug. 14, 1945 |